UNITED STATES PATENT OFFICE.

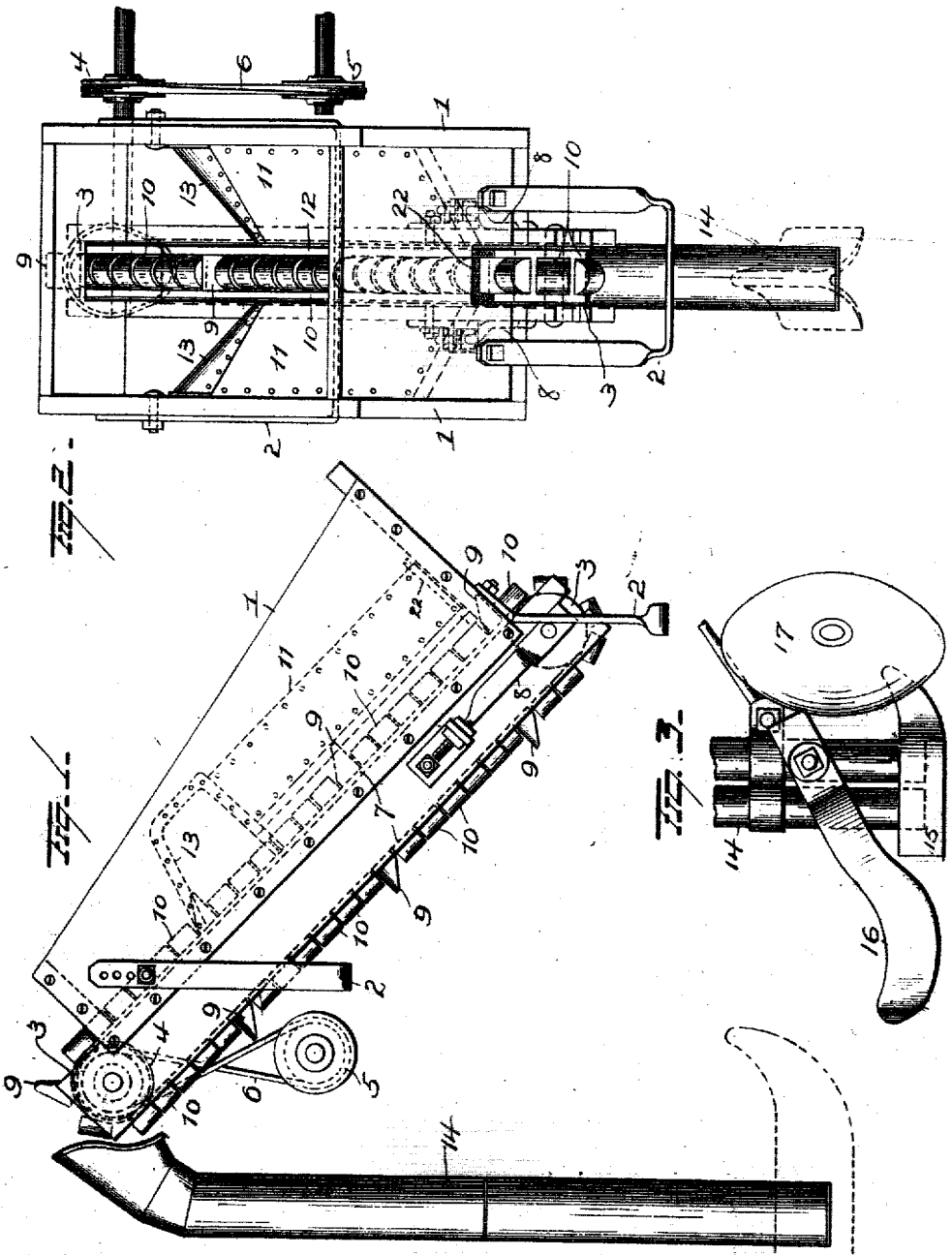

IRA JAMES KAAR, OF HAVELOCK, NEBRASKA.

POTATO-FEEDING MECHANISM.

No. 825,466.	Specification of Letters Patent.	Patented July 10, 1906.

Application filed January 30, 1906. Serial No. 298,689.

*To all whom it may concern:*

Be it known that I, IRA JAMES KAAR, a resident of Havelock, in the county of Lancaster and State of Nebraska, have invented certain new and useful Improvements in Potato-Feeding Mechanism; and I do hereby declare the following to be a full, clear, and exact description of the invention, such as will enable others skilled in the art to which it appertains to make and use the same.

My invention relates to improvements in potato-feeding mechanism, more particularly designed as an attachment for the double lister disclosed in Patent No. 760,872, granted to me May 24, 1904, the object of my present invention being to provide improved means for feeding the seed-potatoes to the feed-tube of the planter.

With this and other objects in view the invention consists in certain novel features of construction and combinations and arrangements of parts, as will be more fully hereinafter described, and pointed out in the claims.

In the accompanying drawings, Figure 1 is a view in side elevation of my improved attachment. Fig. 2 is a plan view thereof, and Fig. 3 is an enlarged detail view of the boot and coöperating mechanism.

1 represents a hopper-box disposed at an angle approximately forty-five degrees and supported upon bracket-bars 2 and provided at opposite ends with sprocket-wheels 3. The upper sprocket-wheel is secured upon a shaft carrying a pulley 4, to which motion is transmitted by a driving-pulley 5, connected therewith by a crossed strap or belt 6. An endless sprocket-chain 7 passes over the sprocket-wheels 3, and the lower sprocket-wheel is provided with a chain-tightener 8 to adjust the chain and take up slack. On the chain 7 at regular intervals apart are buckets 9, having open fronts, and between the buckets curved deflectors 10 are secured on the chain for a purpose which will hereinafter appear.

The hopper 1 is provided with inclined partition-plates 11, forming a valley 12, through which the chain passes, and inclined plates 13 are located near the upper end of the valley to direct superfluous potato-seed back therein. These inclined plates 13 are located some distance from the upper end of the hopper, so as to provide ample space for the casting aside of all but the potatoes in the cups, which latter drop their contents into a tube 14, by means of which the potatoes are directed to the ground in furrow made by runner 15. A seed-coverer 16 is preferably provided for scraping the earth over the potatoes. Disks 17, located at an angle, are disposed in front of the runners 15 to open the furrow. A curtain 22 is located at the lower end of hopper 1 and is pushed out of the way by the buckets in entering the lower end of the valley and falls back to prevent escape of potato-seed. As the buckets move along the valley they will necessarily move quite a number of potatoes besides those in the buckets; but when the buckets pass out of the valley the superfluous potatoes will be deflected to both sides by deflectors 10 and find their way back to the valley, and only the potatoes in the buckets will be dropped into tube 14.

While I have described but one potato-feed box, it is to be understood that with my improved double lister, disclosed in my patent above referred to, two of these potato-feeding mechanisms will be employed to take the place of the feeding mechanism shown in the patent, and my improvements are especially designed to fit this double lister and operate as a double potato-planting lister.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a feeding mechanism, the combination with a hopper having a valley in its bottom, and an endless conveyer movable through said valley, of transverse deflectors in said hopper projecting laterally from the valley therein.

2. In a feeding mechanism, the combination with a hopper having a valley therein terminating at a point inwardly removed from the discharge end of the hopper, and an endless conveyer movable through and beyond said valley, of deflectors in said hopper extending laterally from and beyond the discharge end of the valley.

3. In a feeding mechanism, the combination with a hopper having a valley therein and an endless conveyer movable through said valley, of a flexible apron at the inlet end of said valley.

4. In a potato-feeding mechanism for planters, the combination of a hopper, a chain movable through the hopper, buckets at intervals on the chain, and deflectors on the chain between the buckets.

5. In a potato-feeding mechanism for planters, the combination of a hopper, a chain movable through the hopper, buckets at intervals on the chain, and curved or rounded deflector-blocks on the chain occupying the space between the buckets to throw all potatoes to the sides that are not taken by the buckets.

6. In a potato-feeding mechanism for planters, the combination of a hopper having a valley therein and inclines at the end of the valley, a chain movable through the valley, and buckets on the chain to carry potatoes out of the valley.

7. In a potato-feeding mechanism for planters, the combination of an inclined hopper having a valley therein and inclines at the upper end of the valley, a chain movable through the valley, buckets at intervals on the chain, deflector-blocks on the chain between the buckets, and a tube into which the buckets deposit their contents.

8. In a potato-feeding mechanism, the combination of an inclined hopper having a valley therein, inclines at the upper end of the valley, a curtain at the lower end of the valley, an endless chain passing through the valley, buckets on the chain, deflector-blocks between the buckets, means for driving the chain and means for tightening the chain.

In testimony whereof I have signed this specification in the presence of two subscribing witnesses.

IRA JAMES KAAR.

Witnesses:
A. W. EASTERDAY,
G. E. HAGER.